United States Patent [19]

Dinges

[11] Patent Number: 4,959,886
[45] Date of Patent: Oct. 2, 1990

[54] CONSTRUCTION FORM PLUG FOR NAIL

[76] Inventor: Harold D. Dinges, 302 N. Taylor, Pleasant Hill, Mo. 64080

[21] Appl. No.: 405,304

[22] Filed: Sep. 11, 1989

[51] Int. Cl.$^5$ .......................... E04B 1/62; E04D 3/36
[52] U.S. Cl. ........................................ 16/2; 411/542; 411/546
[58] Field of Search ...................... 16/2; 411/546, 544, 411/542, 480, 482

[56] References Cited

U.S. PATENT DOCUMENTS

| | | | |
|---|---|---|---|
| 3,910,588 | 10/1975 | Austin | 411/542 |
| 4,092,896 | 6/1978 | Puchy | 411/542 |
| 4,236,438 | 12/1980 | McGauran et al. | 411/542 |
| 4,361,997 | 12/1982 | DeCaro | 411/542 |
| 4,413,767 | 11/1983 | Hellinger | 411/546 |
| 4,663,910 | 5/1987 | Hasan | 411/542 |

FOREIGN PATENT DOCUMENTS

| | | | |
|---|---|---|---|
| 294717 | 6/1967 | Australia | 411/542 |
| 1046456 | 10/1966 | United Kingdom | 411/542 |
| 1243547 | 8/1971 | United Kingdom | 411/542 |

*Primary Examiner*—Richard K. Seidel
*Assistant Examiner*—Carmine Cuda
*Attorney, Agent, or Firm*—Hovey, Williams, Timmons & Collins

[57] ABSTRACT

A low cost, durable, easily reuseable construction form plug (10) is provided to secure a nailed board (42) to the top of a construction form (38). The form plug (10) preferably includes a body (12) presenting a plug end (16), a flange (18) and a bore (30). The plug end (16) is inserted into a hole (35) within the construction form (38), a nail (40) is then driven through the bore (30) so as to engage the board (42) so that the board (42) is securely fixed to the form (38) thereby raising the effective height of the form (38) for purposes of pouring concrete (46) and the like. The plug end (16) includes a circumferential rib (20) which extends radially slightly beyond the radial periphery of the plug end (16) proper. In particularly preferred forms, the form plug (10) is composed substantially of 20% high density and 80% low density polyethylene.

1 Claim, 1 Drawing Sheet

CONSTRUCTION FORM PLUG FOR NAIL

BACKGROUND OF THE INVENTION

1. Field of the Invention

This invention relates to a construction form plug of simple yet highly effective construction which is designed for securely nailing extension members to construction forms. More particularly, it is concerned with a form plug presenting a plug end adapted to snugly fit within the form, a flange, and structure defining nail-receiving bore centrally disposed within the body.

2. Description of the Prior Art

Construction forms are widely used for the purpose of pouring foundations and basement walls and the like. It often happens that the form is not tall enough for the desired wall height. For example, an eight feet six inch wall may be desired, yet the form is only eight feet tall. Rather than connecting a second form on top of the first in order to increase the effective pouring height, a less cumbersome method is often used, namely to use construction boards on an ad hoc basis, such as a two by twelve. This method is not only less cumbersome —it is cheaper, simpler and more cost effective. Holes are provided in the top of the forms for the connection of additional forms thereon, and these are the holes used to attach boards and the like on an ad hoc basis.

Different methods of achieving incremental, additional height to construction forms have been used. One method is to use metal extension members manufactured for that very purpose. These members have shafts adapted to fit into the form holes, there typically being four holes along the form. While this is a relatively effective method of achieving additional height, it is a relatively costly method. Duplex nails are sometimes used to attach boards on top of forms, but are impractical in that they require the drilling of a second hole in close proximity to any form hole used, due to the fact that each duplex nail has two nail shafts in close proximity. Crab clips employ a C-shaped geometry, wherein the bight of the C engages the top of the form, with the legs of the C exhibiting a gripping action on either side of the top of the form. A plate-like member extends upwardly from the bight to provide a site for horizontally driving a nail into the board. Cap clips, finally, provide a base plate which engages the top of the form, a shaft extending downwardly therefrom through the form hole with a wedge being inserted through the shaft so as to securely fix the cap clip to the form. As with the crab clip, the cap clip has an upwardly extending flange providing a site for receiving a nail to be driven horizontally into the board.

The problem with these devices is that they have limited durability for reuse and extraction from the form is somewhat problematic. What is needed is a device which provides a secure site for driving a nail into the board but with the device being durable, reusable and low in cost.

SUMMARY OF THE INVENTION

The problems outlined above are in large measure solved by the construction form plug in accordance with the present invention. That is to say, the form plug hereof is reusable, durable, low cost and provides a secure and effective method of driving a nail through a form hole into a board.

The construction form plug in accordance with the present invention broadly includes a body and structure defining an axially extending bore, substantially centrally located within the body. The body presents a plug end adapted to snugly fit within the form hole, and a flange adapted to the form. In particularly preferred forms, the axial dimension of the plug end is about 7/32 of an inch. Additionally, the plug end includes a circumferential rib which extends slightly beyond the radial periphery thereof. In particularly preferred forms, the form plug is composed of about twenty percent high density and eighty percent low density polyethylene.

DESCRIPTION OF THE PREFERRED EMBODIMENT

Figure 1:
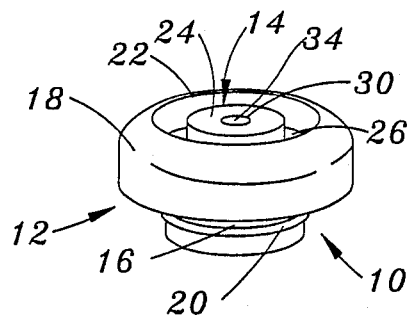
FIG. 1 is a perspective view of the construction form plug in accordance with the present invention.

Referring now to the drawing in general, and FIG. 1 in particular, a construction form plug for a nail (also referred to herein as a form plug, or alternatively an article) 10 in accordance with the invention is shown in inverted orientation for ease of illustration, and broadly includes body 12 and bore-defining structure 14. Article 10 is used to secure an extension member to a construction form by means of a nail.

In more detail, body 12 includes plug end 16 and flange portion 18. Plug end 16 is cylindrical in shape and has a diameter of about 21/32 of an inch. Plug end 16 has a circumferential rib 20 integrally formed thereon. The axial dimension of rib 20 is less than 1/32 of an inch. Rib 20 facilitates easy removal of article 10 from the production mold when article 10 is made of a synthetic resin material. The axial length of plug end 16 is about 7/32 of an inch, because the top of a construction form normally has a height of ¼ inch.

Figure 2:
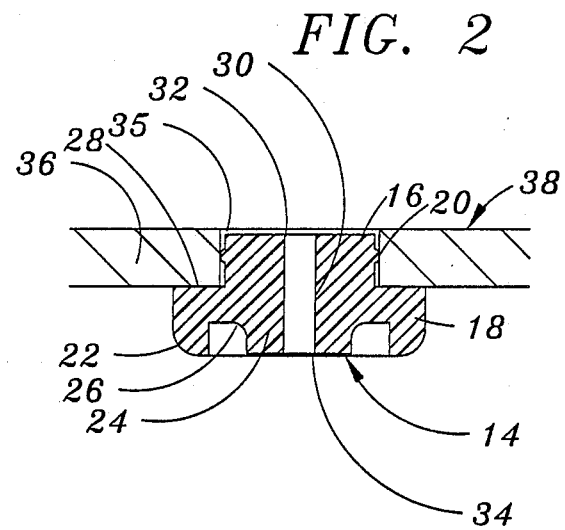
FIG. 2 is a vertical sectional view of the form plug inserted into a construction form.

Flange 18 includes lip 22, support member 24, groove 26 and contact surface 28 (see FIG. 2). The outer diameter of flange 18 is about 1 and 3/32 inches. Cylindrical support member 24 is integral with and axially extends from the remaining portions of flange 18 and has a diameter of about 7/16 of an inch in the preferred embodiment. Support member 24 and other selected portions of flange 18 cooperatively define annular groove 26 as shown. The diameter of support member 24 generally can range between about ¼ and ¾ of an inch but in particularly preferred forms is about 7/16 of an inch. Contact surface 28 is substantially flat and flange 18 is greater in diameter than plug end 16 for reasons discussed below.

Structure 14 defines bore 30 having a top end 32 and bottom end 34 (see FIG. 2). Bore 30 is about 1/16 of an inch in diameter and is adapted to receive standard construction nails.

In the preferred embodiment, article 10 is made of synthetic resin material. In particularly preferred forms the article 10 is composed substantially of about 20% high density polyethylene and about 80% low density polyethylene. This particular composition achieves optimum curing time, facile removal from the mold and maximum rigidity for purposes of securely holding nails. Groove 26, having an outer diameter of about 25/32 and an inner diameter of about 7/16 of an inch, facilitates optimum cooling and curing of the product particularly with reference to the 20% high density and 80% low density mixture referred to above.

In use, article 10 is inserted into hole 35 disposed on the top portion 36 of form 38 as indicated in FIG. 2. The diameter and the rigidity of plug 16 ensure that article 10 is securely mated therein. Contact surface 28 abuts the top portion 36 of form 38 so that plug end 16 does not protrude from the other side of hole 35. A construction nail 4 may then be inserted into bore 30 starting at the bottom end 34 and tapped partially into a board 42 to achieve a purchase therein as shown on the left hand side of FIG. 3. The nail 40 may then be driven in to any desired length so as to securely fix board 42 to form 38. On the right hand side of FIG. 3 the double headed nail 40 is shown driven in to the first head 44.

Figure 3:
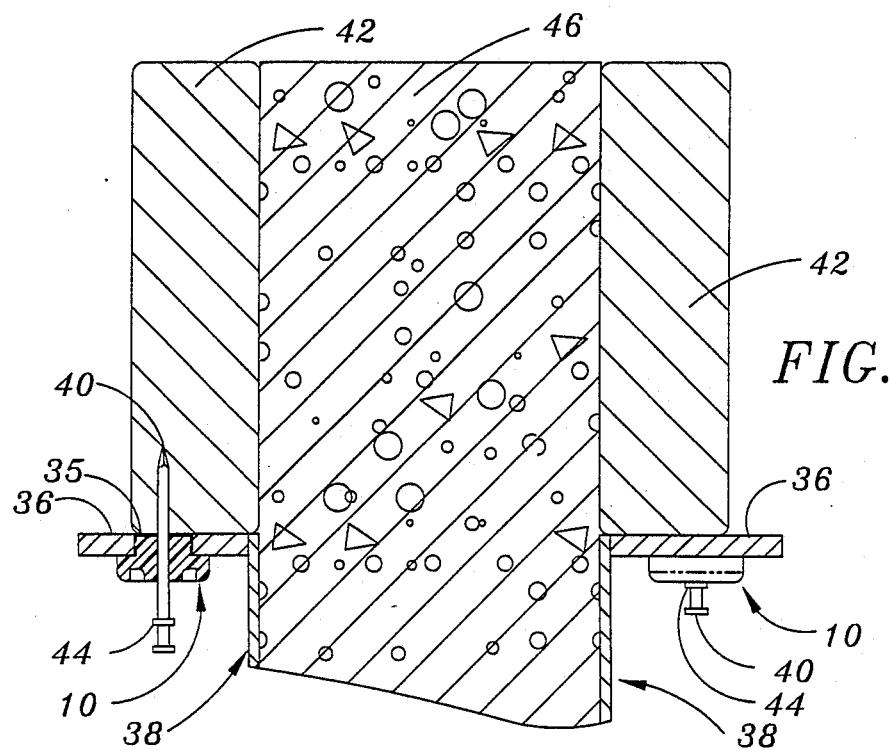
FIG. 3 is a partially sectional view of curing concrete being held in place by two construction forms and extension members respectively secured by two form plugs and two nails.

The right hand side of FIG. 3 depicts the completed use of article 10. That is to say, article 10 is held within form 38 and holds nail 40, thereby securely holding board 42 to form 38 so that the effective height of 38 is increased for the purpose of containing curing concrete 46 or other construction materials.

Those skilled in the art will readily appreciate that article 10 will have other uses for devices other than construction forms wherein such devices have holes of a similar diameter to that of plug end 16. In this regard it will be noted that rib 20 gives additional holding power to article 10. Further, other shaft-like elements other than nails may be used along the length of bore 30. It will also be understood that the various dimensions of article 10 may be modified to meet a variety of geometric and structural exigencies. Finally, those skilled in the art will also readily appreciate that extension members other than boards may be used in connection with construction forms or other devices so that almost an infinite variety of combinations can usefully incorporate article 10 provided plug end 16 will satisfactorily mate with the intended aperture.

The article 10 is dyed a bright color such as orange in the preferred embodiment so as to be easily spotted for removal from the form or simply for inspection. The fact that the article 10 may be produced of a synthetic resin material makes such dyeing cheap and convenient. Further, the fact that the invention is manufactured of a synthetic resin material in its preferred embodiment makes the final product cheap, durable and easily reusable. In contradistinction, prior art metal devices tend to be dull in color and therefore less conspicuous. Metal devices are also more difficult to reuse and less durable due to the properties of such thin metal devices.

I claim:

1. A construction form plug for engagement with a construction form presenting a hole for insertion therein and for receiving a fastening member axially therethrough comprising:

a plug end presenting a substantially cylindrical sidewall and a substantially planar top end, said plug end having a diameter to height ratio of about three to one, said cylindrical sidewall presenting a circumscribing rib extending radially outwardly therefrom, said rib being located on said plug end and complimentarily sized with said hole for insertion therein with said rib in engagement with a surrounding portion of said form, the height of said plug end being less than the depth of said hole; and a flange portion of a greater cross-sectional area than said plug end presenting a substantially flat surface for engagement with a portion of said form surrounding said hole and an opposite bottom end presenting an annular lip and a support member spaced radially inward therefrom defining an annular groove therebetween, said support member and groove being located at said bottom end of said plug opposite said top end, said flat surface of said flange portion extending substantially perpendicular to said sidewall of said plug end and substantially parallel to said top end, said flange and said plug end defining a centrally located bore extending axially therethrough, said bore being of a constant diameter adapted for slidably receiving a fastener therein, and being defined radially inwardly of said support member, said support member presenting a thickness defined by said bore and said groove, said thickness being greater than said bore, said plug being unitarily formed of a mixture of high-density polyethylene and low-density polyethylene in a ratio of about one to five.

* * * * *